United States Patent
Homma et al.

(10) Patent No.: US 9,285,536 B2
(45) Date of Patent: Mar. 15, 2016

(54) OPTICAL FIBER AND OPTICAL FIBER CABLE

(71) Applicant: SUMITOMO ELECTRIC INDUSTRIES, LTD., Osaka-shi, Osaka (JP)

(72) Inventors: Yuya Homma, Yokohama (JP); Itaru Sakabe, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/592,081

(22) Filed: Jan. 8, 2015

(65) Prior Publication Data

US 2015/0192734 A1 Jul. 9, 2015

(30) Foreign Application Priority Data

Jan. 9, 2014 (JP) ................................ 2014-002412

(51) Int. Cl.
  *G02B 6/02* (2006.01)
  *G02B 6/036* (2006.01)
  *G02B 6/44* (2006.01)

(52) U.S. Cl.
  CPC .......... *G02B 6/02395* (2013.01); *G02B 6/4429* (2013.01)

(58) Field of Classification Search
  CPC .................... G02B 6/02395; G02B 6/4429
  USPC ................................................. 385/102–108
  See application file for complete search history.

(56) References Cited

U.S. PATENT DOCUMENTS

| | | | | |
|---|---|---|---|---|
| 5,644,670 | A | * | 7/1997 | Fukuda ................ G02B 6/0288 385/124 |
| 7,903,918 | B1 | * | 3/2011 | Bickham ............... G02B 6/0288 385/124 |
| 8,189,978 | B1 | | 5/2012 | Bennett et al. |
| 8,731,358 | B2 | * | 5/2014 | Pare .................... G02B 6/03661 385/126 |
| 9,110,220 | B2 | * | 8/2015 | Bickham ............... G02B 6/0288 |
| 2008/0166094 | A1 | * | 7/2008 | Bookbinder ............. G02B 6/14 385/124 |
| 2008/0181567 | A1 | * | 7/2008 | Bookbinder ....... G02B 6/02366 385/127 |
| 2010/0043953 | A1 | * | 2/2010 | Riddett ............ C03B 37/02736 156/167 |
| 2011/0280527 | A1 | * | 11/2011 | Tamura ................ G02B 6/4433 385/101 |
| 2013/0129288 | A1 | * | 5/2013 | Homma ............... G02B 6/4401 385/101 |

FOREIGN PATENT DOCUMENTS

| | | |
|---|---|---|
| JP | 2001-194565 | 7/2001 |
| JP | 3518089 | 4/2004 |

* cited by examiner

*Primary Examiner* — Akm Enayet Ullah
(74) *Attorney, Agent, or Firm* — Drinker Biddle & Reath LLP

(57) ABSTRACT

An optical fiber comprises a glass portion comprising a core and a cladding surrounding the core, and, a resin portion comprising a non-removable resin layer tightly covering the glass portion and comprising an ultraviolet curing resin and a buffer layer covering the non-removable resin layer and comprising an ultraviolet curing resin. A diameter of the core falls within a range from 20 μm or larger to 80 μm or smaller, and an outer diameter of the non-removable resin layer falls within a range from 120 μm or larger to 127 μm or smaller. In this optical fiber, when flexural rigidity of the glass portion is EI(g) and flexural rigidity of the resin portion is EI(r), EI(g)≥EI(r) is satisfied.

6 Claims, 9 Drawing Sheets

Fig.6

| PARAMETER | UNIT | EXAMPLES | | | | |
|---|---|---|---|---|---|---|
| | | 1 | 2 | 3 | 4 | 5 |
| CORE DIAMETER | μm | 50 | 50 | 50 | 20 | 80 |
| CLADDING DIAMETER | μm | 80 | 100 | 100 | 100 | 100 |
| DIAMETER OF NON-REMOVABLE RESIN LAYER | μm | 125 | 125 | 125 | 125 | 125 |
| PRIMARY DIAMETER | μm | 200 | 200 | 200 | 200 | 200 |
| SECONDARY DIAMETER | μm | 245 | 245 | 245 | 245 | 245 |
| YOUNG'S MODULUS OF NON-REMOVABLE RESIN LAYER (23°C) | MPa | 1270 | 1270 | 620 | 1270 | 1270 |
| YOUNG'S MODULUS OF PRIMARY RESIN LAYER (23°C) | MPa | 0.2 | 0.2 | 0.2 | 0.2 | 0.2 |
| YOUNG'S MODULUS OF SECONDARY RESIN LAYER (23°C) | MPa | 850 | 850 | 850 | 850 | 850 |
| EI(g) | N·mm² | 0.147 | 0.358 | 0.358 | 0.358 | 0.358 |
| EI(r) | N·mm² | 0.096 | 0.093 | 0.088 | 0.093 | 0.093 |
| YOUNG'S MODULUS OF NON-REMOVABLE RESIN LAYER (85°C) | MPa | 14 | 14 | 8 | 14 | 14 |
| GLASS ADHESION FORCE (85°C) | N/m | 110 | 110 | 120 | 110 | 110 |
| EA(85°C) | — | 1540 | 1540 | 960 | 1540 | 1540 |
| PULL-OUT FORCE | g | 750 | 750 | 1200 | 750 | 750 |
| INITIAL OPTICAL CHARACTERISTICS (WAVELENGTH OF 850nm) | dB/km | A(3.8dB/km) | A(3.2dB/km) | A(3.0dB/km) | A(2.8dB/km) | A(3.5dB/km) |
| TEMPERATURE CHARACTERISTICS | dB/km | A(0.08dB/km) | A(0.04dB/km) | A(0.02dB/km) | A(0.03dB/km) | A(0.06dB/km) |
| RUPTURE RESISTANCE | — | A | A | A | A | A |
| POLISHING CHARACTERISTICS | μm | A | A | B | A | A |
| COATING REMOVABILITY | — | A | A | A | A | A |
| FLUCTUATION CHARACTERISTICS OF RESIN | μm | A | A | A | A | A |

Fig.7

| PARAMETER | UNIT | EXAMPLES | | | | |
|---|---|---|---|---|---|---|
| | | 6 | 7 | 8 | 9 | 10 |
| CORE DIAMETER | μm | 50 | 50 | 50 | 50 | 50 |
| CLADDING DIAMETER | μm | 100 | 100 | 110 | 80 | 100 |
| DIAMETER OF NON-REMOVABLE RESIN LAYER | μm | 125 | 125 | 125 | 125 | 125 |
| PRIMARY DIAMETER | μm | 200 | 200 | 200 | 200 | 180 |
| SECONDARY DIAMETER | μm | 245 | 245 | 245 | 245 | 300 |
| YOUNG'S MODULUS OF NON-REMOVABLE RESIN LAYER (23°C) | MPa | 1600 | 1100 | 1270 | 1270 | 1270 |
| YOUNG'S MODULUS OF PRIMARY RESIN LAYER (23°C) | MPa | 0.2 | 0.2 | 0.2 | 0.2 | 0.2 |
| YOUNG'S MODULUS OF SECONDARY RESIN LAYER (23°C) | MPa | 850 | 850 | 850 | 1300 | 850 |
| EI(g) | N·mm² | 0.358 | 0.358 | 0.525 | 0.147 | 0.358 |
| EI(r) | N·mm² | 0.095 | 0.091 | 0.090 | 0.140 | 0.303 |
| YOUNG'S MODULUS OF NON-REMOVABLE RESIN LAYER (85°C) | MPa | 350 | 12 | 14 | 14 | 14 |
| GLASS ADHESION FORCE (85°C) | N/m | 4 | 42 | 110 | 110 | 110 |
| EA(85°C) | — | 1400 | 504 | 1540 | 1540 | 1540 |
| PULL-OUT FORCE | g | 1650 | 700 | 750 | 800 | 750 |
| INITIAL OPTICAL CHARACTERISTICS (WAVELENGTH OF 850nm) | dB/km | A(3.3dB/km) | A(3.1dB/km) | A(2.7dB/km) | B(7.4dB/km) | B(5.6dB/km) |
| TEMPERATURE CHARACTERISTICS | dB/km | A(0.06dB/km) | A(0.03dB/km) | A(0.03dB/km) | B(0.22dB/km) | B(0.13dB/km) |
| RUPTURE RESISTANCE | — | A | A | B | A | A |
| POLISHING CHARACTERISTICS | μm | A | A | A | A | A |
| COATING REMOVABILITY | — | B | A | A | A | A |
| FLUCTUATION CHARACTERISTICS OF RESIN | μm | A | B | A | A | A |

Fig. 8

| PARAMETER | UNIT | COMPARATIVE EXAMPLES | | | | |
|---|---|---|---|---|---|---|
| | | 1 | 2 | 3 | 4 | 5 |
| CORE DIAMETER | μm | 50 | 50 | 50 | 80 | 50 |
| CLADDING DIAMETER | μm | 80 | 80 | 80 | 100 | 125 |
| DIAMETER OF NON-REMOVABLE RESIN LAYER | μm | 125 | 125 | 125 | 125 | — |
| PRIMARY DIAMETER | μm | 200 | 240 | 200 | 180 | 200 |
| SECONDARY DIAMETER | μm | 245 | 400 | 245 | 245 | 245 |
| YOUNG'S MODULUS OF NON-REMOVABLE RESIN LAYER (23°C) | MPa | 2300 | 1600 | 550 | 2000 | — |
| YOUNG'S MODULUS OF PRIMARY RESIN LAYER (23°C) | MPa | 0.2 | 0.2 | 0.2 | 0.2 | 0.2 |
| YOUNG'S MODULUS OF SECONDARY RESIN LAYER (23°C) | MPa | 1500 | 1000 | 1500 | 4000 | 850 |
| EI(g) | N·mm² | 0.147 | 0.147 | 0.147 | 0.358 | 0.875 |
| EI(r) | N·mm² | 0.170 | 1.110 | 0.153 | 0.515 | 0.084 |
| YOUNG'S MODULUS OF NON-REMOVABLE RESIN LAYER (85°C) | MPa | 420 | 350 | 12 | 380 | — |
| GLASS ADHESION FORCE (85°C) | N/m | 3 | 4 | 33 | 4 | — |
| EA(85°C) | — | 1260 | 1400 | 396 | 1520 | — |
| PULL-OUT FORCE | g | 630 | 1670 | 550 | 820 | — |
| INITIAL OPTICAL CHARACTERISTICS (WAVELENGTH OF 850nm) | dB/km | C(8.3dB/km) | C(11.1dB/km) | C(8.3dB/km) | C(8.5dB/km) | A(2.5dB/km) |
| TEMPERATURE CHARACTERISTICS | dB/km | C(0.39dB/km) | C(0.62dB/km) | C(0.35dB/km) | C(0.49dB/km) | A(0.01dB/km) |
| RUPTURE RESISTANCE | — | A | A | A | A | C |
| POLISHING CHARACTERISTICS | μm | A | A | C | A | — |
| COATING REMOVABILITY | — | A | B | A | A | — |
| FLUCTUATION CHARACTERISTICS OF RESIN | μm | A | A | C | A | — |

OPTICAL FIBER AND OPTICAL FIBER CABLE

TECHNICAL FIELD

The present invention relates to an optical fiber and an optical fiber cable.

BACKGROUND

Optical fiber cables used in the field of inter-connection are directed to general users, and, therefore, used under a severer environment than an environment in which trunk optical fiber cables are used. For example, assuming that an optical fiber cable is bent at an angle close to 180°, the optical fiber cable is required to have rupture resistance that optical fibers inside the optical fiber cable are less likely to rupture even if the optical fiber cable is bent with a small bending radius of, for example, 1.5 mm to 2 mm.

To obtain favorable rupture resistance, it is effective to make a glass diameter of the optical fiber smaller. Because the glass diameter of the optical fiber is typically 125 µm, if a thin optical fiber having a glass diameter of less than 125 µm is used, the rupture resistance is improved (see, for example, Japanese Patent No. 3518089 and the specification of U.S. Pat. No. 8,189,978).

SUMMARY

However, the present inventors found that if the glass diameter of the optical fiber is smaller, optical transmission loss of the optical fiber becomes larger depending on a value of flexural rigidity EI (g) of a glass portion of the optical fiber and a value of flexural rigidity EI (r) of a resin portion covering the glass portion of the optical fiber. For example, if the glass portion meanders by shrinkage of the resin portion under low temperature, transmission loss becomes large. Further, a problem arises that the glass portion meanders due to curing shrinkage occurring at the resin portion upon manufacturing of the optical fiber, which degrades initial optical characteristics.

An optical fiber according to one aspect of the present invention comprises: a glass portion comprising a core and a cladding surrounding the core; and a resin portion comprising a non-removable resin layer tightly covering a surface of the glass portion and comprising an ultraviolet curing resin, and a buffer layer covering the non-removable resin layer and comprising an ultraviolet curing resin, wherein a diameter of the core falls within a range from 20 µm or larger to 80 µm or smaller, an outer diameter of the non-removable resin layer falls within a range from 120 µm or larger to 127 µm or smaller, and, when flexural rigidity of the glass portion is EI(g) and flexural rigidity of the resin portion is EI(r), EI(g)≥EI(r) is satisfied.

BRIEF DESCRIPTION OF THE DRAWINGS

FIG. 4A is a plan view when the optical fiber is bonded to mat boards, FIG. 4B is a plan view when a cutting portion is formed, and FIG. 4C is a perspective view when the cutting portion is bent;

FIG. 6 is a table summarizing parameters and characteristics of optical fibers for Examples 1 to 5;

FIG. 7 is a table summarizing parameters and characteristics of optical fibers for Examples 6 to 10;

FIG. 8 is a table summarizing parameters and characteristics of optical fibers for Comparative examples 1 to 5.

DETAILED DESCRIPTION

Figure 1A:
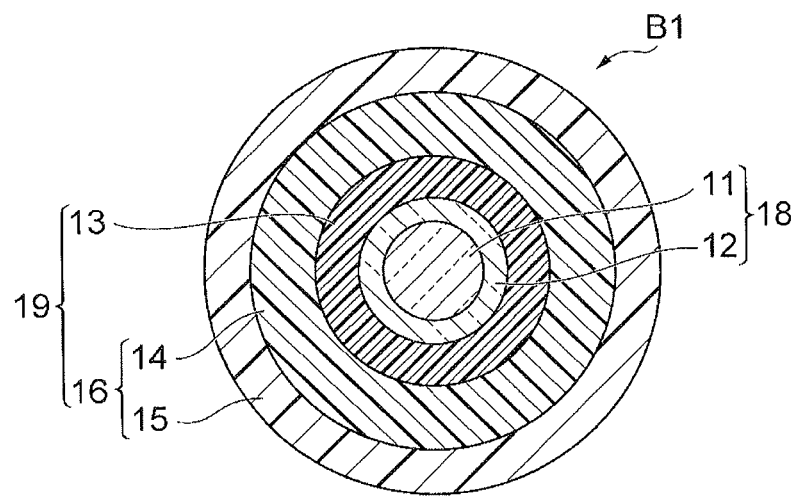
FIG. 1A is a diagram illustrating an example structure of an optical fiber B1 of the present embodiment.

Explanation of an Embodiment of the Present Invention

First, features of an embodiment of the present invention will be listed and described. An optical fiber according to one aspect of the present invention comprises (1) a glass portion comprising a core and a cladding surrounding the core, and a resin portion comprising a non-removable resin layer tightly covering a surface of the glass portion and comprising an ultraviolet curing resin, and a buffer layer covering the non-removable resin layer and comprising an ultraviolet curing resin, a diameter of the core falls within a range from 20 µm or larger to 80 µm or smaller, an outer diameter of the non-removable resin layer falls within a range from 120 µm or larger to 127 µm or smaller, and, when flexural rigidity of the glass portion is EI(g) and flexural rigidity of the resin portion is EI(r), EI(g)≥EI(r) is satisfied.

With this optical fiber, it is possible to provide favorable rupture resistance as a result of an outer diameter of the glass portion comprised of the core and the cladding being made smaller than that of the conventional optical fiber, and maintain the outer diameter of 120 µm or larger and 127 µm or smaller by the non-removable resin covering the cladding. Further, because the diameter of the core falls within a range from 20 µm or larger to 80 µm or smaller, it is possible to reduce coupling loss with a light source and a light receiving portion such as a photo detector (PD). In addition, because, in this optical fiber, EI(g)≥EI(r), it is possible to suppress meandering of the glass portion which occurs due to curing shrinkage of the ultraviolet curing resin, shrinkage of the resin portion under low temperature, or the like, so that it is possible to provide favorable rupture resistance and excellent optical characteristics.

(2) In the above-described optical fiber, a Young's modulus of the non-removable resin layer at 23° C. may be 600 MPa or higher. In this optical fiber, when the Young's modulus of the non-removable resin layer at 23° C. is 600 MPa or higher, the non-removable resin layer is prevented from being scraped excessively when an end face of the optical fiber is polished.

Exposure of the glass portion is reduced and rupture of the optical fiber is less likely to occur at a connector portion, so that rupture resistance becomes favorable.

(3) In the above-described optical fiber, the buffer layer may comprise a primary resin layer and a secondary resin layer, a Young's modulus of the primary resin layer at 23° C. may fall within a range from 0.1 MPa or higher to 3.0 MPa or lower, and a Young's modulus of the secondary resin layer at 23° C. may fall within a range from 100 MPa or higher to 1500 MPa or lower. Because, in this optical fiber, the primary resin layer having a low Young's modulus and the secondary resin layer having a high Young's modulus are included in the buffer layer, even if a lateral pressure is applied, micro-bending loss and flaws of the glass portion from outside are reduced, so that favorable rupture resistance is maintained.

(4) In the above-described optical fiber, when pull-out force for pulling out a length of 10 mm of the glass portion and the non-removable resin layer from the buffer layer at a tension rate of 5 mm/min is measured, the pull-out force may fall within a range from 250 g or higher to 1700 g or lower. Because, in this optical fiber, the pull-out force is 250 g or higher, the non-removable resin layer is less likely to be separated from the buffer layer even at low temperature. Further, because the pull-out force is 1700 g or lower, strong force is not required when the buffer layer is removed, so that it is possible to reduce flaws generated on a surface of the non-removable resin layer.

(5) In the above-described optical fiber, when a Young's modulus of the non-removable resin layer at 85° C. is E [MPa] and glass adhesion force of the non-removable resin layer at 85° C. in a 90 degrees peel test is A [N/m], EA which is the product of E and A at 85° C. may satisfy $EA \geq 500$. While an optical fiber to which a connector is attached is used at temperature range from −40° C. or higher to 85° C. or lower, particularly, under high temperature such as at 85° C., there is a risk that an adhesive used for bonding the non-removable resin within a ferrule hole may be thermally expanded and may compress the non-removable resin, and the non-removable resin may protrude from an end face of the ferrule, which may change a state where the optical fiber is bonded at the end face and may affect optical transmission. According to this optical fiber, because the above-described formula is satisfied, even under high temperature, for example, at 85° C., the non-removable resin layer is less likely to protrude, so that it is possible to suppress influence on the optical transmission.

(6) The above-described optical fiber cable may comprise any of the above-described optical fibers and a sheath covering the optical fiber. According to this optical fiber cable, because the optical fiber comprises any of the above-described optical fibers, it is possible to provide favorable rupture resistance and excellent optical characteristics.

Details of the Embodiment of the Present Invention

Specific examples of the optical fiber and the optical fiber cable according to the embodiment of the present invention will be described below with reference to the drawings. It should be noted that the present invention is not limited to these examples, and is intended to include all changes within the meaning recited in the claims and equivalent to the meaning of the claims and the scope of the claims. In the following description, the same reference numerals will be assigned to the same components, and overlapped explanation will be omitted.

Figure 1B:
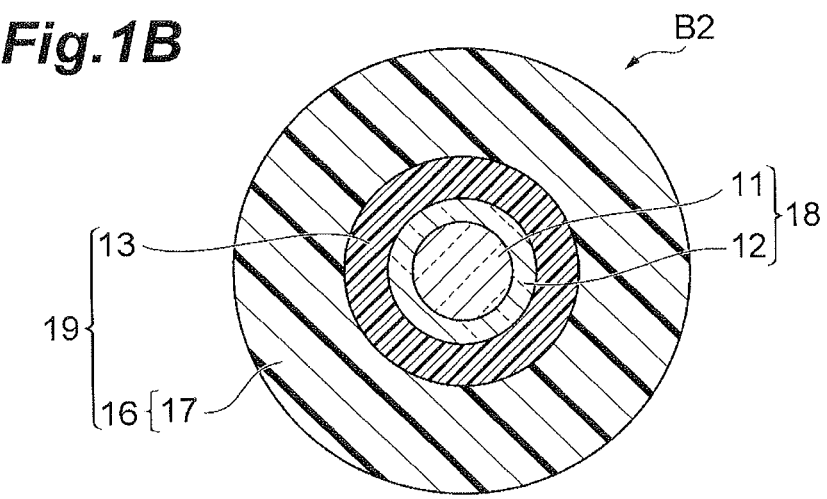
FIG. 1B is a diagram illustrating an example structure of an optical fiber B2 of the present embodiment.
Figure 9:
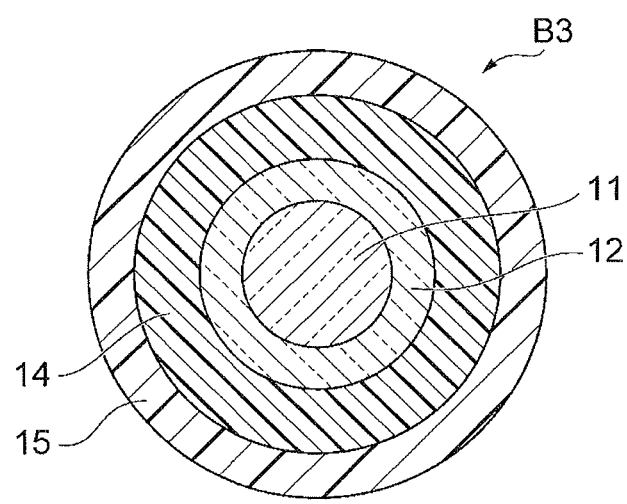
FIG. 9 is a diagram illustrating an example structure of a conventional optical fiber B3.

FIG. 1A, FIG. 1B and FIG. 9 are diagrams illustrating example structures of the optical fiber. FIG. 1A and FIG. 1B are diagrams respectively illustrating example structures of cross-sections perpendicular to axial directions of the optical fibers B1 and B2 of the present embodiment, and FIG. 9 is a diagram illustrating an example structure of a cross-section perpendicular to an axial direction of the conventional optical fiber B3 (which is not an optical fiber of the present invention). The optical fibers B1 and B2 each comprises a glass portion 18 including a core 11 and a cladding 12, and, a resin portion 19 including a non-removable resin layer 13 and a buffer layer 16. The core 11 and the cladding 12 mainly contain glass, and the cladding 12 surrounds the core 11. In one example, the core 11 and the cladding 12 are formed with, for example, glass such as silica glass. A detailed structure of the glass portion 18 will be described later (see FIG. 3A, FIG. 3B and FIG. 3C). The non-removable resin layer 13 mainly contains an ultraviolet curing resin. The non-removable resin layer 13 tightly covers a surface of the glass portion 18 (in the present embodiment, a surface of the cladding 12), and is not removed, for example, when a connector is connected. In the optical fiber B1, the non-removable resin layer 13 is covered with a primary resin layer 14 and a secondary resin layer 15. The primary resin layer 14 and the secondary resin layer 15 form the buffer layer 16, and mainly contain an ultraviolet curing resin. In the optical fiber B2, the non-removable resin layer 13 is covered with a resin layer 17. The resin layer 17 forms a single-layer buffer layer 16, and mainly contains an ultraviolet curing resin. As described above, the buffer layer 16 may be a single layer, for example, formed with the resin layer 17, or may be a multi-layer formed with the primary resin layer 14, the secondary resin layer 15, and the like. It should be noted that the core 11 and the cladding 12 of the optical fiber B3 are also comprised of glass. However, in the optical fiber B3, a non-removable resin layer is not provided between the cladding 12 and the primary resin layer 14.

Figure 2A:
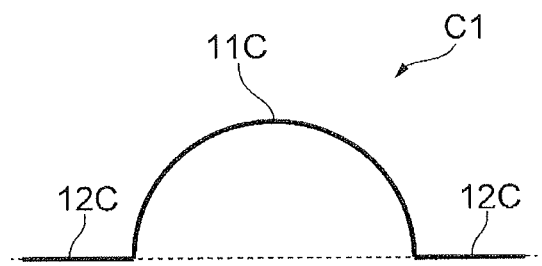
FIG. 2A is a diagram illustrating an example structure of refractive index profile C1 of the optical fibers B1 and B2 of the present embodiment.
Figure 2B:
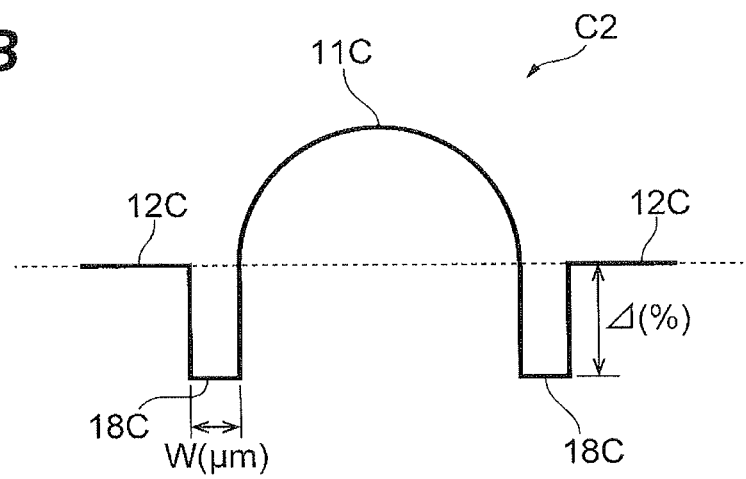
FIG. 2B is a diagram illustrating an example structure of refractive index profile C2 of the optical fibers B1 and B2 of the present embodiment.
Figure 2C:
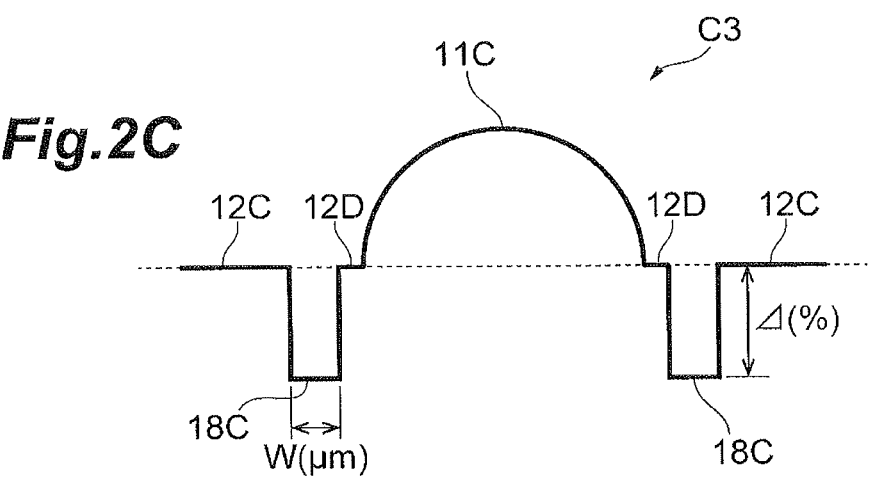
FIG. 2C is a diagram illustrating an example structure of refractive index profile C3 of the optical fibers B1 and B2 of the present embodiment.
Figure 3A:
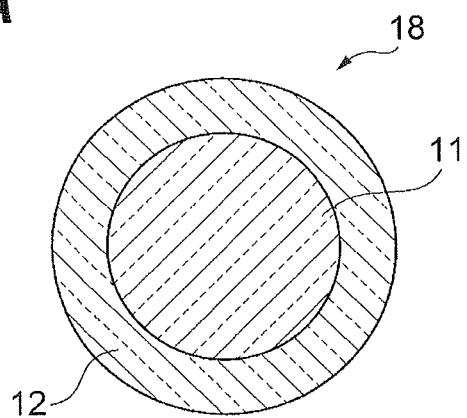
FIG. 3A, FIG. 3B and FIG. 3C are detailed views of the glass portion of the optical fibers B1 and B2 of the present embodiment.
Figure 3B:
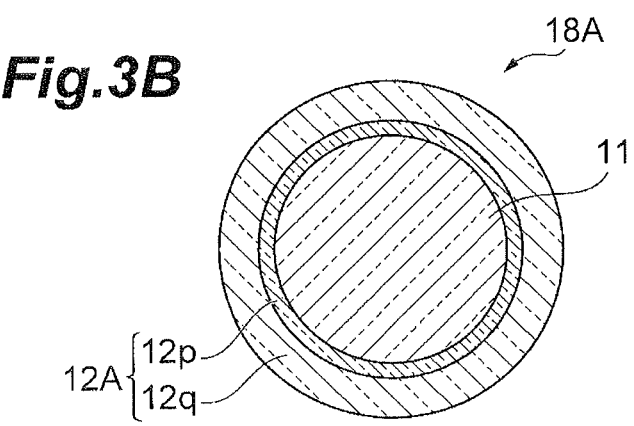
Figure 3C:
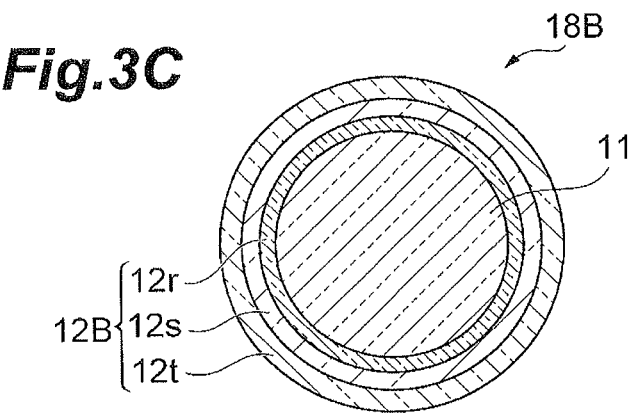

FIG. 2A is a diagram illustrating an example structure of refractive index profile C1 of the optical fibers B1 and B2 of the present embodiment. FIG. 2B is a diagram illustrating an example structure of refractive index profile C2 of the optical fibers B1 and B2 of the present embodiment. The refractive index profile C1 in FIG. 2A is GI (Graded Index) profile. This GI profile has core refractive index distribution 11C which is refractive index distribution of the core 11 and cladding refractive index distribution 12C which is refractive index distribution of the cladding 12. The cladding refractive index distribution 12C is located adjacent to the core refractive index distribution 11C, and has smaller refractive index than that of the core refractive index distribution 11C. The refractive index profile C2 in FIG. 2B has a structure in which a depressed portion 18C is located adjacent to the core refractive index distribution 11C. The depressed portion 18C is a portion having smaller refractive index than that of the cladding refractive index distribution 12C. FIG. 2C is a diagram illustrating an example structure of refractive index profile C3 of the optical fibers B1 and B2 of the present embodiment. The refractive index profile C3 in FIG. 2C has a structure where an inner cladding 12D exists between the core refractive index distribution 11C and the depressed portion 18C. As in the refractive index profile C2 and C3, the optical fibers B1 and B2 may have a depressed portion 18C in the cladding 12. The optical fibers B1 and B2 of the present embodiment preferably have favorable bending characteristics as well as preferable rupture resistance when the optical fibers are bent with a small bending radius. By providing the depressed portion 18C at the cladding 12, it is possible to improve bending characteristics. FIG. 3A to FIG. 3C are cross-sectional diagrams illustrating detailed example structures of the glass portions of the optical fibers B1 and B2 of the present embodiment. FIG. 3A to FIG. 3C respectively illustrate structures of the glass portions having the refractive index profile illustrated in FIG. 2A to FIG. 2C. That is, the glass portion 18 illustrated in FIG. 3A has the core 11 corresponding to the core refractive index distribution 11C illustrated in FIG. 2A and has the cladding 12 corresponding to the cladding refractive index distribution 12C. Further, the glass portion 18 can be replaced with any of the glass portions 18A and 18B illustrated in FIG. 3B and FIG. 3C. The glass portion 18A has the core 11 and a cladding 12A. The cladding 12A has a cladding 12p corresponding to the depressed portion 18C illustrated in FIG. 2B and a cladding 12q corresponding to the cladding refractive index distribution 12C. The glass portion 18B has the core 11 and a cladding 12B. The cladding 12B has a cladding 12r corresponding to the inner cladding 12D illustrated in FIG. 2C, a cladding 12s corresponding to the depressed portion 18C and a cladding 12t corresponding to the cladding refractive index distribution 12C.

The present inventors found that in the optical fibers B1 and B2, when a diameter of the core 11, an outer diameter of the non-removable resin layer 13 and flexural rigidity fall within specific ranges, rupture resistance and optical characteristics of the optical fibers B1 and B2 become excellent. Specifically, the inventors found that, when the diameter of the core 11 falls within a range from 20 μm or larger to 80 μm or smaller, the outer diameter of the non-removable resin layer 13 falls within a range from 120 μm or larger to 127 μm or smaller, and, when flexural rigidity of the glass portion 18 is EI(g) and flexural rigidity of the resin portion 19 is EI(r), and if EI(g)≥EI(r) is satisfied, the rupture resistance and the optical characteristics of the optical fibers B1 and B2 become excellent. These conditions and operational effects will be described in detail below. When the diameter of the core 11 is a value falling within a range from 20 μm or larger to 80 μm or smaller, coupling loss with a light source and a light receiving portion is effectively reduced, so that it is possible to contribute to excellent optical characteristics. The diameter of the core 11 may fall within a range, for example, from 25 μm or larger to 60 μm or smaller. The core 11 comprised of glass may have, for example, GI refractive index profile such as the core refractive index distribution 11C illustrated in FIG. 2A to FIG. 2C. When the refractive index distribution n(r) is:

$$n(r) = n_1 \left( 1 - \frac{n_1^2 - n_0^2}{n_1^2} \left( \frac{r}{a} \right)^\alpha \right)^{\frac{1}{2}}$$

(where $n_1$ is maximum refractive index of the core, $n_0$ is minimum refractive index of the core, a is a radius of the core, and r is distance from the center of the core), α ranges, for example, from 1.8 or larger to 2.2 or smaller, and refractive index difference of the core 11 with respect to the cladding 12 falls within a range, for example, from 0.5% or larger to 2.0% or smaller. When the refractive index profile of the core 11 is GI profile, it is possible to expand a wavelength band of optical transmission compared to a case where the refractive index profile of the core 11 is SI (Step Index) profile. The wavelength band of the optical fibers B1 and B2 is, for example, 1000 MHz·km or higher.

Further, as described above, to obtain favorable rupture resistance, it is effective to make the glass diameter of the optical fiber smaller. In the present embodiment, it is possible to provide favorable rupture resistance by making the outer diameter of the glass portion 18 smaller than that of the conventional optical fiber, and maintain a size of the outer diameter by the non-removable resin layer 13 covering the glass portion 18. The outer diameter of the non-removable resin layer 13 is preferably set at a value within a range from 120 μm or larger to 127 μm or smaller. While the optical fibers B1 and B2 are inserted into the ferrule holes in a state where the buffer layers 16 are removed, at that time, the non-removable resin layers 13 of the optical fibers B1 and B2 and the ferrules are fixed via an adhesive. Because a pore diameter of the ferrule ranges typically approximately from 125.5 μm or larger to 128 μm or smaller, the outer diameter of the non-removable resin layer 13 is set at, for example, 127 μm or less which is slightly smaller than the pore diameter of the ferrule so as to facilitate insertion of the non-removable resin layer 13 into the ferrule. Meanwhile, by setting the outer diameter of the non-removable resin layer 13 at 120 μm or greater, displacement between the center of the core 11 and the center of the hole of the ferrule becomes small, so that it is possible to reduce coupling loss with a light source or a light receiving portion such as a photo detector (PD) and contribute to excellent optical characteristics.

Concerning flexural rigidity, when flexural rigidity of the glass portion 18 is EI(g) and flexural rigidity of the resin portion 19 is EI(r), and if EI(g) is equal to or higher than EI(r), optical characteristics of the optical fibers B1 and B2 become favorable. That is, because flexural rigidity of the resin portion 19 becomes dominant when EI(g) falls below EI(r), for example, the glass portion 18 meanders due to shrinkage of the resin and transmission loss increases when the optical fibers B1 and B2 are subjected to a heat cycle test. Further, the glass portion 18 also meanders due to curing shrinkage of the ultraviolet curing resin upon manufacturing, and initial optical characteristics degrade. On the other hand, when EI(g)≥EI(r), because rigidity of the glass portion 18 is larger, it is possible to prevent occurrence of the above-described phenomena. That is, in the optical fibers B2 and B3, by satisfying the above-described formula, because the glass portion 18 is less likely to meander due to curing shrinkage of the resin portion 19 or shrinkage under low temperature, transmission loss is prevented from increasing, so that it is possible to provide excellent optical characteristics.

It should be noted that the flexural rigidity EI(g) of the glass portion 18 is calculated from a Young's modulus (73 GPa) of the glass and the outer diameter of the glass portion 18. The flexural rigidity EI(r) of the resin portion 19 is calculated from a Young's modulus of each resin layer included in the resin portion 19 and the outer diameter of each resin layer. When a Young's modulus of the i-th layer from the inside is $G_i$ and moment of inertia of area of the i-th layer is $I_i$, flexural rigidity D of a columnar (or cylindrical) structure having a layered structure is calculated by the following equation:

$$D = \Sigma G_i \times I_i$$

Here, when a radius of the i-th layer is $R_i$ and a radius of the (i−1)-th layer is $R_{i-1}$, moment of inertia of area Ii of the i-th layer can be expressed as follows:

$$I_i = \pi (R_i^4 - R_{i-1}^4)/64$$

In the present embodiment, the non-removable resin layer 13 and the buffer layer 16 are formed with an ultraviolet curing resin. The ultraviolet curing resin is comprised of, for example, an oligomer of urethane (meth)acrylate or epoxy (meth)acrylate, a monofunctional or multifunctional (meth)acrylate monomer, an amine-containing monomer, a vinyl monomer, a cycloaliphatic epoxy monomer, a monofunctional or multifunctional epoxy monomer, an oxetane monomer, an optical radical initiator, a photoacid generator, a photosensitizer, a silane coupling agent, a leveling agent, an antifoaming agent and/or an antioxidant. The non-removable resin layer 13 which tightly adheres to the glass portion 18 can contain, for example, a silane coupling agent. Addition of the silane coupling agent improves adhesion force between the non-removable resin layer 13 and the glass portion 18. The silane coupling agent also provides an effect of improving rupture resistance of the glass by repairing a minute flaw of glass interface.

To improve reactive property of the silane coupling agent, the ultraviolet curing resin may contain an acid material. Examples of the acid material include carboxylic acid such as (meth)acrylic acid and a photoacid generator. The photoacid generator is preferably an onium salt having a structure of $A^+B^-$. Examples of the onium salt include a sulfonium salt and an iodonium salt. Because high dynamic fatigue property provides an effect of improving the rupture resistance, the dynamic fatigue property is set, for example, 18 or higher or 22 or higher. The dynamic fatigue property is measured according to a test method of FOTP-28 (specification of Telecommunication Industry Association).

It should be noted that the non-removable resin layer 13 refers to a coated layer where, when a resin coated layer coated on the non-removable resin layer 13 is removed with a coating removal jig (such as JR-25 manufactured by Sumitomo Electric Industries, Ltd.) for optical fibers, the non-removable resin layer 13 remains to tightly adhere to a layer (in the present embodiment, the glass portion 18) inside the non-removable resin layer 13 and only a layer over the non-removable resin layer 13 (in the present embodiment, the buffer layer 16) is removed. The adhesion force between the glass portion 18 and the non-removable resin layer 13 is, for example, 3 N/m or higher, or 15 N/m or higher in a 90 degrees peel test.

Favorable rupture resistance and optical characteristics of the optical fibers B1 and B2 can be also provided by adjustment of the outer diameter of the cladding 12 (cladding diameter) and numerical aperture (NA). The cladding diameter is set to fall within a range, for example, from 80 μm or larger to 110 μm or smaller, or from 80 μm or larger to 100 μm or smaller, to ensure optical characteristics and mechanical strength. Because the cladding diameter (that is, the outer diameter of the glass portion 18) is 110 μm or smaller, rupture resistance when the optical fiber is bent with a small bending radius is further improved. Because the cladding diameter (the outer diameter of the glass portion 18) is 80 μm or greater, the optical fibers B1 and B2 become sufficiently flexible and durable, which makes it easy for the optical fibers to be inserted into the ferrule holes. By this means, it is possible to improve workability when a connector is attached, which is favorable in terms of manufacturing.

An NA value is set so as to fall within a range, for example, from 0.15 or larger to 0.30 or smaller. By setting the NA value at 0.15 or higher, it is possible to prevent transmission loss from degrading even with a bending radius of the optical fibers B1 and B2 having, for example, a radius of approximately 5 mm. Accordingly, it is possible to reduce interruption of communication, so that it is possible to provide an optical fiber suitable for the field of inter-connection. Further, by setting the NA value at 0.30 or lower, it is possible to reduce coupling loss with a light source or a light receiving portion such as a PD, so that it is possible to contribute to excellent optical characteristics.

To further improve rupture resistance of the optical fibers B1 and B2, it is also possible to adjust a Young's modulus of the non-removable resin layer 13. The optical fibers B1 and B2 are ultimately formed into a cable and used by an optical fiber cable terminal being attached through a connector. At this time, in the optical fiber cable terminal, the buffer layer 16 of each of the optical fibers B1 and B2 is removed, and, then, the glass portion 18 and the non-removable resin layer 13 are inserted into a ferrule and fixed with an adhesive, and an end face of the optical fibers is polished to be smoothed. Because the Young's modulus of the non-removable resin layer 13 is smaller than the Young's modulus of the glass portion 18 (approximately 73 GPa), upon polishing, the glass portion 18 is more scraped than the non-removable resin layer 13. The more the non-removable resin layer 13 is scraped, the more an exposure region of the glass portion 18 expands.

The present inventors found that in the optical fibers B1 and B2, when the Young's modulus of the non-removable resin layer 13 at 23° C. is 600 MPa or higher, it is possible to further improve rupture resistance of the optical fibers B1 and B2. That is, if the Young's modulus of the non-removable resin layer 13 which holds the cladding 12 becomes 600 MPa or higher, the amount scrapping the non-removable resin layer 13 is scraped can be suppressed, and the exposure region of the glass portion 18 can be made small, for example, 2 μm or less. It is therefore possible to effectively prevent rupture of the optical fibers at the connector portion. The Young's modulus of the non-removable resin layer 13 at 23° C. may be 1000 MPa or higher. By this means, it is possible to provide the above-described effects prominently.

Further, in the optical fibers B1 and B2, when the buffer layer 16 includes the primary resin layer 14 and the secondary resin layer 15, the Young's modulus of the primary resin layer 14 at 23° C. falls within a range, for example, from 0.1 MPa or higher to 3.0 MPa or lower, and the Young's modulus of the secondary resin layer 15 at 23° C. falls within a range, for example, from 100 MPa or higher to 1500 MPa or lower.

When a lateral pressure is applied to the optical fibers B1 and B2, because the buffer layer 16 includes the primary resin layer 14 having a low Young's modulus and the secondary resin layer 15 having a high Young's modulus as described above, it is possible to reduce micro-bending loss and flaws generated on the glass portion 18. Further, when the buffer layer 16 is formed with a single layer (resin layer 17), the Young's modulus of the buffer layer 16 at 23° C. falls within a range, for example, from 10 MPa or higher to 2000 MPa or lower. It should be noted that a colored layer (ink layer, not illustrated) may be coated on a surface of the secondary resin layer 15 or other resin layers may be provided around the secondary resin layer 15. Note that, as described above, when flexural rigidity of the glass portion 18 is EI(g) and flexural rigidity of the resin portion 19 including the colored layer and other resin layers is EI(r), EI(g)≥EI(r) is preferable.

Figure 4A:
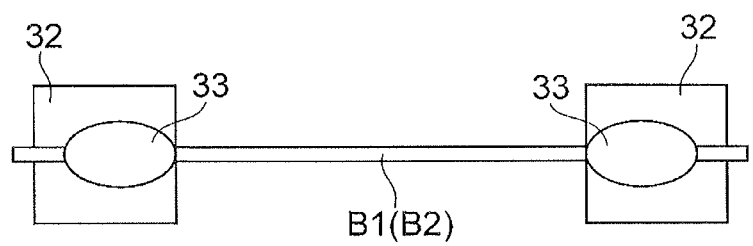
FIG. 4A, FIG. 4B and FIG. 4C are diagrams for explaining a method for measuring adhesion force between a non-removable resin layer and a buffer layer for the optical fiber B1 of the present embodiment.
Figure 4B:
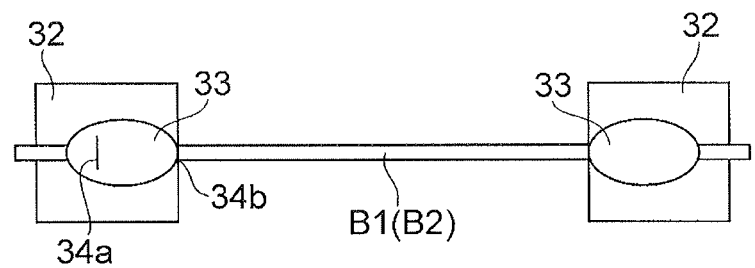
Figure 4C:
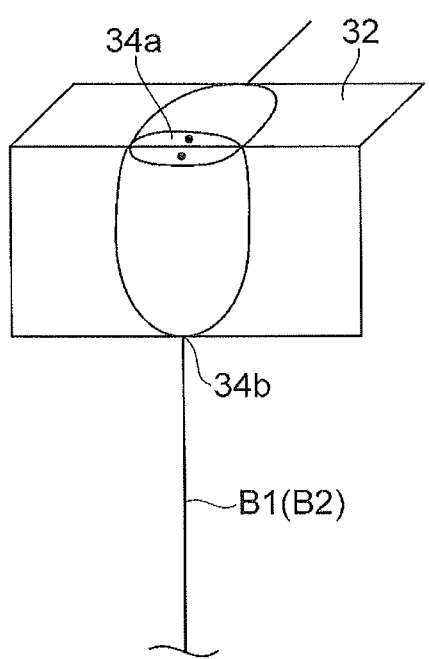

FIG. 4A, FIG. 4B and FIG. 4C are diagrams for explaining a method for measuring adhesion force between the non-removable resin layer 13 and the buffer layer 16 for the optical fiber B1 (a method for the optical fiber B2 is the same as the method for the optical fiber B1). In the present embodiment, the adhesion force is evaluated by measurement of pull-out force for pulling out a length of 10 mm of the glass portion 18 and the non-removable resin layer 13 from the buffer layer 16 at a tension rate of 5 mm/min. It should be noted that the measuring method disclosed in Japanese Patent Application Laid-Open No. 2001-194565 can be employed to measure the pull-out force. FIG. 4A is a plan view when the optical fiber is bonded to mat boards 32, FIG. 4B is a plan view when a cutting portion is formed, and FIG. 4C is a perspective view when the cutting portion is bent.

To measure the pull-out force, first, an optical fiber B1 having a length of 10 mm and mat boards 32 are prepared. Then, as illustrated in FIG. 4A, the both ends of the optical fiber B1 are respectively fixed at the mat boards 32 with an adhesive member 33 in a state where the both ends of the optical fiber B1 slightly project from the mat boards 32. At this time, each of the positions of edge portions of the adhesive member 33 is aligned with one side of an inner side (central side of the optical fiber B1) of each of the mat boards 32. As the adhesive member 33, a member which does not easily deform upon curing, specifically, for example, "jelly-like Aron Alfa™" manufactured by Toagosei Co., Ltd. is used.

After the optical fiber B1 is fixed at the mat boards 32, as illustrated in FIG. 4B, at a cutting portion 34a located within a proper distance from the above-described one side of one of the mat boards 32, the adhesive member 33 and the optical fiber B1 are cut. At the same time, at the cutting portion 34b located on one side of the inner side of the one of the mat boards 32, only the buffer layer 16 of the optical fiber B1 is cut. At this time, at the cutting portion 34a, as illustrated in FIG. 4C, cutting is reliably performed by folding the mat boards 32, 90 degrees. At the cutting portion 34b, only the buffer layer 16 of the optical fiber B1 is cut, and attention is paid so as not to create a flaw on the non-removable resin layer 13.

The mat boards 32 at the both ends of the optical fiber B1 are chucked at a test device. Attention is paid so that a portion between the cutting portion 34a and the cutting portion 34b is not chucked. When the pull-out force is measured, the mat boards 32 are separated from each other at a rate of 5 mm/min, and, as a result, the non-removable resin layer 13 between the cutting portion 34a and the cutting portion 34b, and, a member inside the non-removable resin layer 13 (glass portion 18) are pulled out from the buffer layer 16. The mat boards 32 are separated from each other until the member such as the non-removable resin layer 13 is completely pulled out from the buffer layer 16, and a maximum value of pull-out resistance measured during this time is pull-out force.

In the optical fibers B1 and B2, when the length of the optical fiber is 10 mm and the tension rate is 5 mm/min, the pull-out force of the non-removable resin layer 13 with respect to the buffer layer 16 falls within a range, for example, from 250 g or higher to 1700 g or lower. By providing such pull-out force, proper adhesion force between the non-removable resin layer 13 and the buffer layer 16 is maintained, and the buffer layer 16 is less likely to be detached even at low temperature. Specifically, by setting the pull-out force 250 g or higher, adhesion force between the non-removable resin layer 13 and the buffer layer 16 becomes large, so that it is possible to prevent separation between the non-removable resin layer 13 and the buffer layer 16 at low temperature. Therefore, it is possible to prevent air bubbles at a gap generated by the separation from providing a lateral pressure to the optical fibers B1 and B2, so that it is possible to suppress increase of transmission loss. Meanwhile, by setting the pull-out force 1700 g or lower, the buffer layer 16 is easily removed, so that it is possible to reduce flaws generated on the surface of the non-removable resin layer 13 when the buffer layer 16 is removed. The pull-out force may fall within a range, for example, from 300 g or higher to 1500 g or smaller. To lower the pull-out value, a separating compound such as ultraviolet curable reactive silicone and silicone oil may be added to the non-removable resin layer 13 or the buffer layer 16.

Further, the optical fibers B1 and B2 to which connectors are attached may be used at temperature range from −40° C. or higher to 85° C. or lower. Therefore, particularly, under high temperature such as at 85° C., there is a case where an adhesive which bonds the non-removable resin layer 13 exposed by the buffer layer 16 being removed, with the ferrule may be thermally expanded within the ferrule hole and compress the non-removable resin layer 13, and the non-removable resin layer 13 may protrude from an end face of the ferrule. If a large amount of the non-removable resin layer 13 protrudes, light may be blocked, and light transmission may be affected.

The present inventors found that when a Young's modulus of the non-removable resin layer 13 at 85° C. is E [MPa] and glass adhesion force of the non-removable resin layer 13 in a 90 degrees peel test at 85° C. is A [N/m], and if EA which is the product of E and A at 85° C. satisfies EA≥500, favorable optical characteristics of the optical fibers B1 and B2 are obtained. That is, if EA satisfies these conditions, the Young's modulus or the glass adhesion force of the non-removable resin layer 13 becomes high at high temperature, so that it is possible to prevent the non-removable resin layer 13 from protruding from the end face of the ferrule. This EA may be, for example, 900 or higher. It should be noted that the EA value does not particularly affect improvement of low-temperature characteristics after heat cycle.

Figure 5:
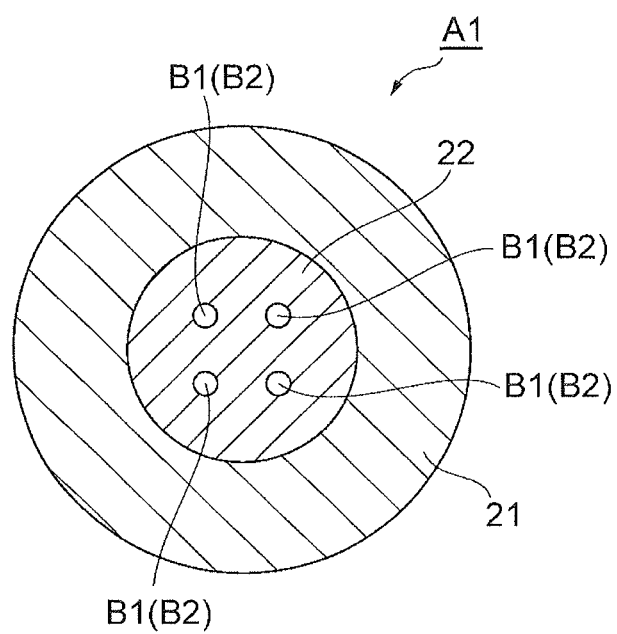
FIG. 5 is a cross-sectional view illustrating an example structure of an optical fiber cable A1 and illustrating a cross-section perpendicular to an axial direction of the optical fiber cable A1.

Further, by using the optical fibers B1 and B2 of the present embodiment in an optical fiber cable, rupture resistance and optical characteristics of the optical fiber cable become favorable. FIG. 5 is a cross-sectional view illustrating an example structure of an optical fiber cable A1, and illustrates a cross-section perpendicular to an axial direction of the optical fiber cable A1. As illustrated in FIG. 5, the optical fiber cable A1 includes one or a plurality of optical fibers B1 (or B2) (a plurality of optical fibers are illustrated in FIG. 5), and a sheath 21 covering the optical fibers B1 (or B2). The sheath 21 which is formed in a substantially cylindrical shape, is provided to protect the plurality of optical fibers B1 (or B2). In internal space of the sheath 21 other than the plurality of optical fibers B1 (or B2), fibrous Kevlar 22 is disposed. Kevlar 22 increases tensile strength and prevents disconnection of the optical fibers B1 (or B2). The number of optical fibers is determined according to applications. The optical fibers are not limited to a single core wire as illustrated in FIG. 5, but may be a ribbon optical fiber.

As described above, according to the optical fibers B1 and B2 according to the present embodiment, it is possible to provide favorable rupture resistance by making a glass diameter smaller, and reduce coupling loss with a light source and a light receiving portion such as a photo detector (PD). In addition, in the optical fibers B1 and B2, when EI(g)≥EI(r), it is possible to prevent the glass portions of the optical fibers B1 and B2 from meandering due to curing shrinkage of the ultraviolet curing resin, or the like, and provide favorable initial optical characteristics.

Example 1

While examples of the present invention will be described in detail below, the present invention is not limited to these examples, and can be modified in various ways. For example, a core diameter (outer diameter of the core), a cladding diameter (outer diameter of the cladding), a diameter of the non-removable resin layer (outer diameter of the non-removable resin layer), a primary diameter (outer diameter of the primary resin layer) and a secondary diameter (outer diameter of the secondary resin layer) of the optical fiber are not limited to those described in the following examples.

FIG. 6 is a table summarizing parameters and characteristics of the optical fibers for Examples 1 to 5. FIG. 7 is a table summarizing parameters and characteristics of the optical fibers for Examples 6 to 10. FIG. 8 is a table summarizing parameters and characteristics of the optical fibers for Comparative examples 1 to 5. In the present examples and the comparative examples, each optical fiber had refractive index profile C1 (see FIG. 2A) and refractive index difference Δ of the core was 1.1%.

In measurement of a Young's modulus of each resin layer of the optical fiber, a cured sheet having a resin thickness of 200 μm was fabricated. An amount of ultraviolet light was set at 1 J/cm². In measurement of the Young's modulus, a dumbbell shaped test piece 2 was used based on JIS K7113, and a tensile test was implemented at a tension rate of 1 mm/min. The Young's modulus was calculated using a formula of a secant line at 2.5% strain.

In measurement of glass adhesion force, a resin was coated on flat glass, and ultraviolet light of a light amount of 1 J/cm² was radiated. A resin layer having a thickness of 200 μm was formed. The glass adhesion force [N/m] was measured through a 90 degrees peel test.

In evaluation of the initial optical characteristics, initial transmission loss of the optical fiber having a length of 1000 m was measured using an optical pulse tester (OTDR) having a wavelength of 850 nm. Measurement temperature was set at 23° C. As a dummy fiber, that is, an optical fiber which transmits light from a light source to the optical fiber which is a measurement sample, an optical fiber which is the same type as the optical fiber to be evaluated was used. A length of the dummy fiber was set at 1 km. The initial optical characteristics were evaluated by initial transmission loss [dB/km]. Evaluation criteria of the initial optical characteristics are set as follows:
A . . . less than 5 dB/km
B . . . 5 dB/km or greater and less than 8 dB/km
C . . . 8 dB/km or greater In evaluation of temperature characteristics, a heat cycle in which an optical fiber having a length of 1000 m was placed at −40° C. for two hours, and, then, placed at 85° C. for two hours, and placed at −40° C. for two hours again, was repeated five times. Transmission loss of the optical fiber was measured by the optical pulse tester (OTDR) having a wavelength of 850 nm. A maximum value [dB/km] of an increment of the transmission loss was evaluated by being compared with an initial value under 23° C. prior to the heat cycle. As the dummy fiber, an optical fiber having a length of 1 km, which is the same type as the fiber to be measured was used. Evaluation criteria of temperature characteristics are set as follows:
A . . . less than 0.1 dB/km
B . . . 0.1 dB/km or greater and less than 0.3 dB/km
C . . . 0.3 dB/km or greater In evaluation of rupture resistance, the optical fiber was wound one turn around a mandrel having a diameter of 3 mm. The rupture characteristics were evaluated by a period elapsed until the optical fiber ruptures. Evaluation criteria of the rupture characteristics are set as follows:
A . . . one month (30 days) or longer
B . . . one week or longer and shorter than one month
C . . . shorter than one week In evaluation of polishing characteristics, the optical fiber was fixed at an FC connector. After fixing, polishing paper having surface roughness of 1 to 10 μm was used to polish (PC polish) end faces of the optical fiber and the ferrule so as to be shaped in a spherical shape. The polished end face of the optical fiber was observed using a microscope. The polishing characteristics were evaluated by a length [μm] of a portion where the non-removable resin layer was scraped and a lateral face of the glass was exposed. Evaluation criteria of the rupture resistance are set as follows:
A . . . less than 1 μm
B . . . 1 μm or greater and less than 2 μm
C . . . 2 μm or greater In evaluation of coating removability, the primary resin layer and the secondary resin layer were removed using a stripper manufactured by Sumitomo Electric Industries, Ltd. The coating removability was evaluated by a depth [μm] of a flaw generated on a surface of the non-removable resin layer when the tightly adhering coating was exposed.
A . . . a depth of a flaw is less than 1 μm
B . . . a depth of a flaw is 1 μm or greater and less than 2 μm
C . . . a depth of a flaw is 2 μm or greater In evaluation of fluctuation characteristics of the resin, the optical fiber was inserted into a ferrule formed of zirconia and fixed at an FC connector using an epoxy adhesive. After fixing, polishing paper having surface roughness of 1 to 10 μm was used to polish (PC polish) end faces of the optical fiber and the ferrule so as to be shaped in a spherical shape. The connector was aged at 85° C. under 85% relative humidity for 30 days. The fluctuation characteristics of the resin were evaluated by observing the end face of the connector using a microscope and by a fluctuation amount [μm] of the non-removable resin layer with respect to the initial state. Evaluation criteria of the fluctuation characteristics of the resin are set as follows:
A . . . a fluctuation amount is 5 μm or smaller
B . . . a fluctuation amount is 5 μm or larger and 10 μm or smaller
C . . . a fluctuation amount is 10 μm or larger It should be noted that in the above-described evaluation criteria, while optical fibers of "A (favorable)" are favorable in terms of reliability, because optical fibers of "B (average)" can be practically used, optical fibers having "B (average)" or higher were regarded as acceptable.

Concerning Examples 1 to 10 illustrated in FIG. 6 and FIG. 7, EI(g)≥EI(r) is satisfied, and, as a result, the initial optical characteristics and the temperature characteristics are favorable or average. Further, a Young's modulus of the non-removable resin layer at 23° C. is 600 MPa or higher in Examples 1 to 10, and, as a result, the polishing characteristics are favorable or average. Further, the pull-out force falls within a range from 250 g or higher to 1700 g or lower in Examples 1 to 10, and, as a result, the coating removability is favorable or average. Still further, the EA value is 500 or higher in Examples 1 to 10, and, as a result, the fluctuation characteristics of the resin are favorable or average.

On the other hand, because in optical fibers in Comparative examples 1 to 4 among Comparative examples 1 to 5 illustrated in FIG. 8, EI(g)<EI(r), the initial optical characteristics and the temperature characteristics are "C (not favorable)". Further, in an optical fiber of Comparative example 3, because a Young's modulus (23° C.) of the non-removable resin layer is smaller than 600 MPa, the polishing characteristics are "C (not favorable)". Further, in the optical fiber of Comparative example 3, because the value of EA (85° C.) is small, the fluctuation characteristics of the resin are "C (not favorable)". Further, because an optical fiber of Comparative example 5 does not include a non-removable resin layer, and a cladding diameter is 125 μm, which is the same as that in the conventional optical fiber, the rupture resistance is "C (not favorable)".

What is claimed is:
1. An optical fiber comprising:
a glass portion comprising a core and a cladding surrounding the core; and
a resin portion comprising a non-removable resin layer tightly covering a surface of the glass portion and comprising an ultraviolet curing resin, and a buffer layer covering the non-removable resin layer and comprising an ultraviolet curing resin, wherein a diameter of the core falls within a range from 20 μm or larger to 80 μm or smaller, an outer diameter of the non-removable resin layer falls within a range from 120 μm or larger to 127 μm or smaller, and when flexural rigidity of the glass portion is EI(g) and flexural rigidity of the resin portion is EI(r), EI(g)≥EI(r) is satisfied.

2. The optical fiber according to claim 1, wherein a Young's modulus of the non-removable resin layer at 23° C. is 600 MPa or higher.

3. The optical fiber according to claim 1, wherein
the buffer layer comprises a primary resin layer and a secondary resin layer,
a Young's modulus of the primary resin layer at 23° C. falls within a range from 0.1 MPa or higher to 3.0 MPa or lower, and
a Young's modulus of the secondary resin layer at 23° C. falls within a range from 100 MPa or higher to 1500 MPa or lower.

4. The optical fiber according to claim 1, wherein when pull-out force for pulling out a length of 10 mm of the glass portion and the non-removable resin layer from the buffer layer at a tension rate of 5 mm/min is measured, the pull-out force falls within a range from 250 g or higher to 1700 g or lower.

5. The optical fiber according to claim 1, wherein when a Young's modulus of the non-removable resin layer at 85° C. is E [MPa] and a glass adhesion force of the non-removable resin layer at 85° C. in a 90 degrees peel test is A [N/m], EA which is a product of E and A at 85° C. satisfies EA≥500.

6. An optical fiber cable comprising:
the optical fiber according to claim 1; and
a sheath covering the optical fiber.

* * * * *